United States Patent
Bang et al.

(10) Patent No.: US 12,348,416 B2
(45) Date of Patent: Jul. 1, 2025

(54) MOBILE DEVICE PERFORMING DATA COMMUNICATION THROUGH CHARGING TERMINALS AND MOBILE SYSTEM INCLUDING SAME

(71) Applicant: SAMSUNG ELECTRONICS CO., LTD., Suwon-si (KR)

(72) Inventors: Sangun Bang, Seongnam-si (KR); Kyung-Ik Jang, Hwaseong-si (KR); Arom Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 347 days.

(21) Appl. No.: 17/972,841

(22) Filed: Oct. 25, 2022

(65) Prior Publication Data
US 2023/0283551 A1     Sep. 7, 2023

(30) Foreign Application Priority Data
Mar. 3, 2022     (KR) .................. 10-2022-0027233

(51) Int. Cl.
H04L 45/74 (2022.01)
G06F 3/16 (2006.01)
H04B 3/54 (2006.01)
H04R 1/10 (2006.01)

(52) U.S. Cl.
CPC ............. *H04L 45/74* (2013.01); *G06F 3/162* (2013.01); *H04B 3/542* (2013.01); *H04R 1/1025* (2013.01); *H04R 1/1041* (2013.01); *H04R 2420/07* (2013.01)

(58) Field of Classification Search
None
See application file for complete search history.

(56) References Cited

U.S. PATENT DOCUMENTS

| | | | |
|---|---|---|---|
| 8,804,482 B2 | 8/2014 | Rhelimi et al. | |
| 9,628,264 B2 | 4/2017 | Theiler et al. | |
| 10,270,489 B2 | 4/2019 | Kearney et al. | |
| 10,735,845 B2 | 8/2020 | Lee et al. | |
| 2019/0200113 A1* | 6/2019 | Kim | H02J 7/342 |
| 2020/0321792 A1 | 10/2020 | Rhee et al. | |
| 2021/0203380 A1* | 7/2021 | Lee | H04B 3/56 |
| 2022/0060039 A1* | 2/2022 | Bang | H04B 1/3827 |

(Continued)

FOREIGN PATENT DOCUMENTS

| | | | | |
|---|---|---|---|---|
| EP | 4362494 A2 * | 5/2024 | ........... | H04R 1/1041 |
| JP | 2008-191787 A | 8/2008 | | |
| KR | 10-0608460 B1 | 8/2006 | | |

*Primary Examiner* — Anh Vu H Ly
(74) *Attorney, Agent, or Firm* — Fish & Richardson P.C.

(57) ABSTRACT

A first mobile device including; first charging terminals, a power line communication modem configured to supply power to a second mobile device connected with the first charging terminals and to perform data communication with the second mobile device, wherein the data communication includes a plurality of data packets, and a microcontroller unit configured to generate primary data including a first data packet among the plurality of data packets, wherein the first data packet includes a first header and a first data message, wherein the first header includes a first code indicating a purpose for the first data packet, and the first data message includes upper bits indicating a destination for data and lower bits indicating a number of data packets included in a first group in the data.

20 Claims, 8 Drawing Sheets

(56) References Cited

U.S. PATENT DOCUMENTS

| | | | | |
|---|---|---|---|---|
| 2022/0222063 A1* | 7/2022 | Bang | ........................ | H04B 3/54 |
| 2022/0225452 A1* | 7/2022 | Jang | ...................... | H04W 88/02 |
| 2022/0232647 A1* | 7/2022 | Jang | ...................... | H04W 28/10 |
| 2022/0312103 A1* | 9/2022 | Bang | .................... | H04R 1/1025 |
| 2023/0097491 A1* | 3/2023 | Jin | ........................ | H04W 48/16 |
| | | | | 370/329 |

* cited by examiner

FIG. 5

| Header | Description of Data Message |
|---|---|
| CODE1 | UB: Destination<br>  UB1: Source Device to Target Device(s)<br>  UB2: Source Device1 to Target Device1<br>  UB3: Source Device2 to Target Device2<br>  UB4: Source Device(s) to Target Device<br>LB: Number of Packets within Variable Portion |
| CODE2 | FDM1: FUNCTION1<br>FDM2: FUNCTION2<br>FDM3: FUNCTION3 |
| CODE3 | CRC VALUE1 |
| CODE4 | Odd Data |
| CODE5 | Even Data |
| CODE6 | CRC VALUE2 |

MOBILE DEVICE PERFORMING DATA COMMUNICATION THROUGH CHARGING TERMINALS AND MOBILE SYSTEM INCLUDING SAME

CROSS-REFERENCE TO RELATED APPLICATIONS

This application claims priority under 35 U.S.C. § 119 to Korean Patent Application No. 10-2022-0027233 filed on Mar. 3, 2022 in the Korean Intellectual Property Office, the subject matter of which is hereby incorporated by reference in its entirety.

BACKGROUND

The inventive concept relates generally to mobile devices capable of performing data communication through charging terminals and systems including same. More particularly, the inventive concept relates to mobile devices capable of exchanging data including a plurality of data packets with other mobile devices through power line communication (PLC) and mobile systems including same.

Wireless earphones are devices that receive signal through a wireless connection and provide an audio output signal. Each wireless earphone, usually provided in a pair of earphones, may include a Bluetooth (BT) module providing short-range communications capability and a battery supplying power to the BT module.

The battery of each wireless earphone requires periodic charging which is usually accomplished through a dedicated charger. For example, wireless earphones may be inserted into a charging case that charges the battery of each of the wireless earphones.

There is a difference between the wireless earphones and so-called "true wireless" earphones. For example, wireless earphones may be wirelessly connected to an external device such as a smartphone, but require a cable providing connection between the wireless earphones. In contrast, true wireless earphones may be wirelessly connected to an external device such as a smartphone, but do not require a cable (or other physical connector(s)) between true wireless earphones.

SUMMARY

Embodiments of the inventive concept provide a mobile device capable of exchanging data including a plurality of data packets with other mobile devices through power line communication (PLC) and a mobile system including same.

In some embodiments, the inventive concept provides a first mobile device including; first charging terminals, a power line communication modem configured to supply power to a second mobile device connected with the first charging terminals and to perform data communication with the second mobile device, wherein the data communication includes a plurality of data packets, and a microcontroller unit configured to generate primary data including a first data packet among the plurality of data packets, wherein the first data packet includes a first header and a first data message, wherein the first header includes a first code indicating a purpose for the first data packet, and the first data message includes upper bits indicating a destination for data and lower bits indicating a number of data packets included in a first group in the data.

In some embodiments, the inventive concept provides a mobile system including; a first mobile device including a first power line communication (PLC) modem, first charging terminals connected to the first PLC modem, second charging terminals connected to the first PLC modem, a first microcontroller unit (MPU) including a first memory storing a first computer program, a first battery, and a first power management integrated circuit (PMIC) controlling the first battery, a second mobile device including a second PLC modem, third charging terminals connected to the second PLC modem and configured to electrically connect the first charging terminals, a second MPU including a second memory storing a second computer program, a second battery, and a second PMIC controlling the second battery, and a third mobile device including a third PLC modem, fourth charging terminals connected to the third PLC modem and configured to electrically connect the second charging terminals, a third MPU including a third memory storing a third computer program, a third battery, and a third PMIC controlling the third batter, wherein the first PLC modem is configured to supply power to the second mobile device through the first charging terminals and the third charging terminals, and supply power to the third mobile device through the second charging terminals and the fourth charging terminals, at least one of the first PLC modem and the first computer program is configured to generate primary data in response to a command received from an external controller, communicate the primary data to the second mobile device through the first charging terminals and the third charging terminals, and communicate the primary data to the third mobile device through the second charging terminals and the fourth charging terminals, and the primary data includes a first data packet including a first header indicating a purpose for the first data packet and a first message indicating a number of data packets in the primary data.

In some embodiments, the inventive concept provides a mobile system including; a first mobile device including a first power line communication (PLC) modem, first charging terminals connected to the first PLC modem, second charging terminals connected to the first PLC modem, and a first microcontroller unit (MPU), a second mobile device including a second PLC modem, third charging terminals connected to the second PLC modem and configured to electrically connect the first charging terminals, and a second MPU, a third mobile device including a third PLC modem, fourth charging terminals connected to the third PLC modem and configured to electrically connect the second charging terminals, and a third MPU, wherein the first PLC modem is configured to supply power to the second mobile device through the first charging terminals and the third charging terminals, and supply power to the third mobile device through the second charging terminals and the fourth charging terminals, the first PLC modem is further configured to generate primary data in response to a command received from an external controller, communicate the primary data to the second mobile device through the first charging terminals and the third charging terminals, and communicate the primary data to the third mobile device through the second charging terminals and the fourth charging terminals, the primary data includes a first data packet including a first header indicating a purpose for the first data packet and a first message indicating a number of data packets in the primary data, the second PLC modem is configured to generate first secondary data in response to the primary data and communicate the first secondary data to the third mobile device through the first mobile device; and the third PLC modem is configured to generate second secondary data in response to the primary data and communicate the second secondary data to the second mobile device through the first mobile device.

BRIEF DESCRIPTION OF THE DRAWINGS

Advantages, benefits and features, as well as the making and use of the inventive concept may be understood upon consideration of the following detailed description together with the accompanying drawings, in which:

FIG. 5 is a table listing possible header codes and data message descriptions for a data packet generated by the first mobile device;

DETAILED DESCRIPTION

Throughout the written description and drawings, like reference numbers and labels are used to denote like or similar elements, components, devices, features and/or method steps.

Figure 1:
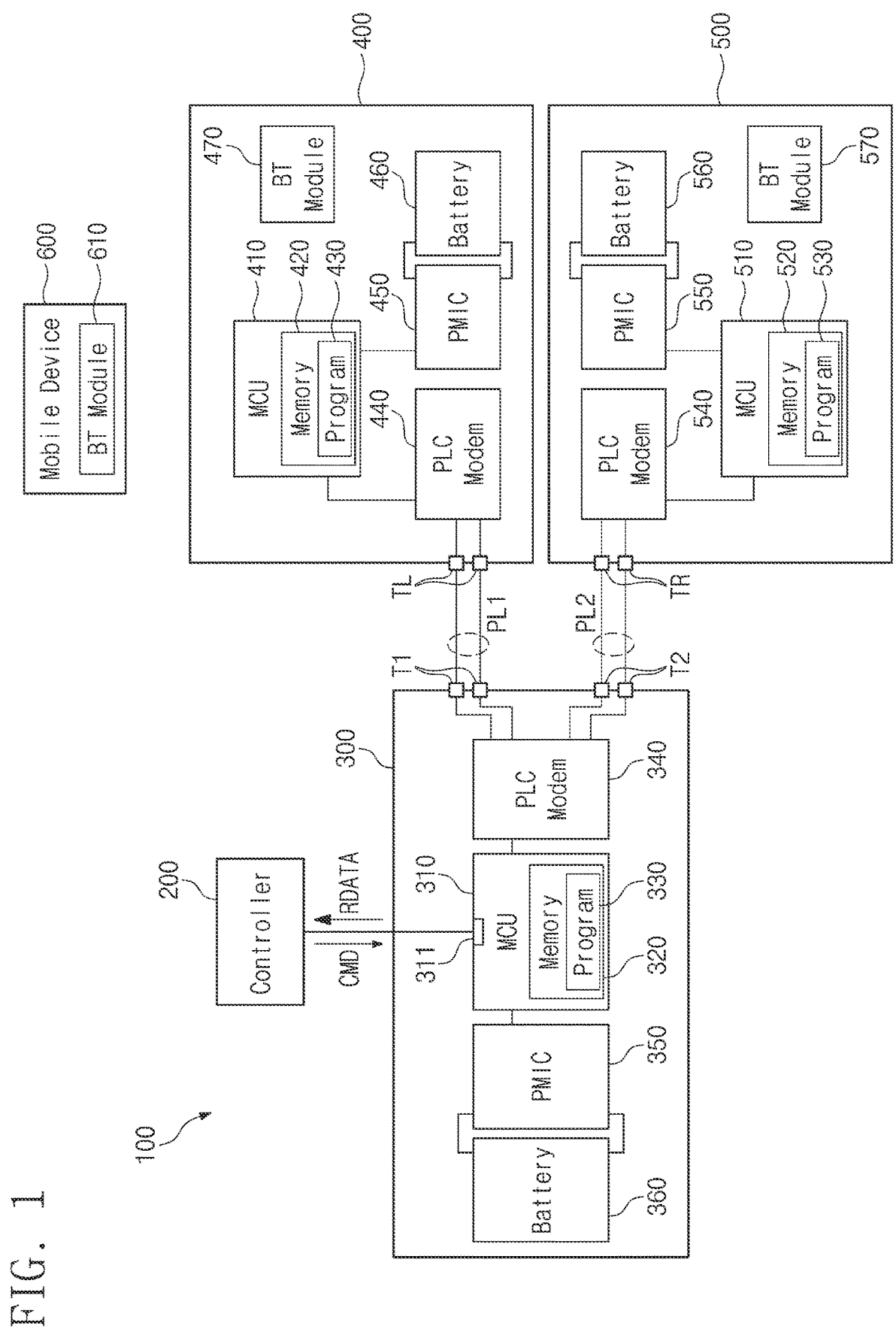
FIG. 1 is a block diagram illustrating a mobile system including a first mobile device according to embodiments of the inventive concept.

Figure (FIG. 1 illustrates a block diagram of a mobile system according to embodiments of the inventive concept. Referring to FIG. 1, a mobile system 100 includes a first mobile device 300, a second mobile device 400, and a third mobile device 500.

In this regard, the mobile system 100 may be a "true wireless" stereo (TWS) system, wherein a true wireless stereo system utilizes a simple paring experience without paring of individual earbuds. That is, a user may "pair" a first earbud with a second earbud in relation to a mobile device, wherein the second earbud is able to automatically initiate paring through the mobile device. In some embodiments, In relation to some embodiments, the phrase "true wireless" denotes a stereo Bluetooth protocol enabling a device (e.g., a mobile device) to stream stereo content to two individual wireless devices.

For convenience of description, a controller 200 (e.g., a Personal Computer (PC) controller) and a fourth mobile device 600 are also illustrated in FIG. 1 together with the mobile system 100. In this regard, the controller 200 may request, through the first mobile device 300, that the mobile device 400 and/or the mobile device 500 communicate (e.g., transmit and/or receive) information through the first mobile device 300.

In some embodiments, the first mobile device 300 may be a wireless earbud charger or a wireless earphone charger. For example, the first mobile device 300 may be a cradle or a charging case that houses the respective mobile devices 400 and 500, and may be used to charge the respective mobile devices 400 and 500 from power lines PL1 and PL2 while the respective mobile devices 400 and 500 are housed within the first mobile device 300.

For example, each of the power lines PL1 and PL2 may include an electrical connector (e.g., a pogo pin, a spring-loaded pin, etc.).

Each of the mobile devices 400 and 500 may be a wireless earbud, a wireless earphone, a wireless headphone, etc. And in some embodiments, the mobile devices 400 and 500 may be true wireless earphones.

When first charging terminals T1 associated with the first mobile device 300 and third charging terminals TL associated with the second mobile device 400 are connected through the first power lines (e.g., a first connector) PL1, the first mobile device 300 may charge the second mobile device 400. Additionally, the first mobile device 300 and the second mobile device 400 may exchange information through the first power lines PL1. In some embodiments, the first mobile device 300 and the second mobile device 400 may exchange data using a low-speed power line communication (PLC) approach.

When second charging terminals T2 associated with the first mobile device 300 and fourth charging terminals TR associated with the third mobile device 500 are connected through the second power lines (or second connector) PL2, the first mobile device 300 may charge the third mobile device 500. Additionally, the first mobile device 300 and the third mobile device 500 may exchange information through the second power lines PL2. In some embodiments, the first mobile device 300 and the third mobile device 500 may exchange data using the low-speed PLC approach. In this regard, the information exchanged between the first mobile device 300 and at least one of the second mobile device 400 and the third mobile device 500 may include various data (e.g., DATA1, DATA2, . . . DP(x−1) and DPx; DATAa, and DATAb, etc.). In some embodiments, such data may be communicated at a frequency of 2.4 KHz.

Figure 8:
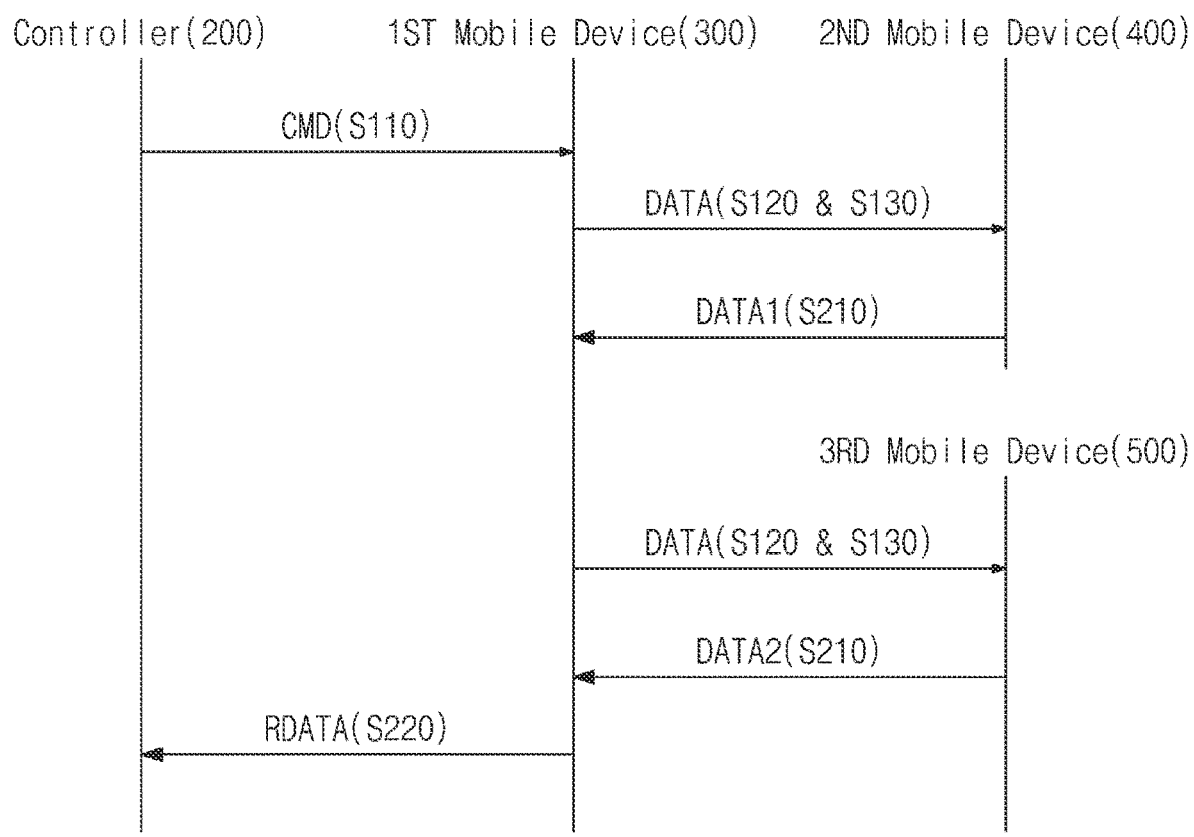
FIG. 8 is a flow diagram illustrating data operations variously performed by a controller, the first mobile device and a second mobile device.
Figure 9:
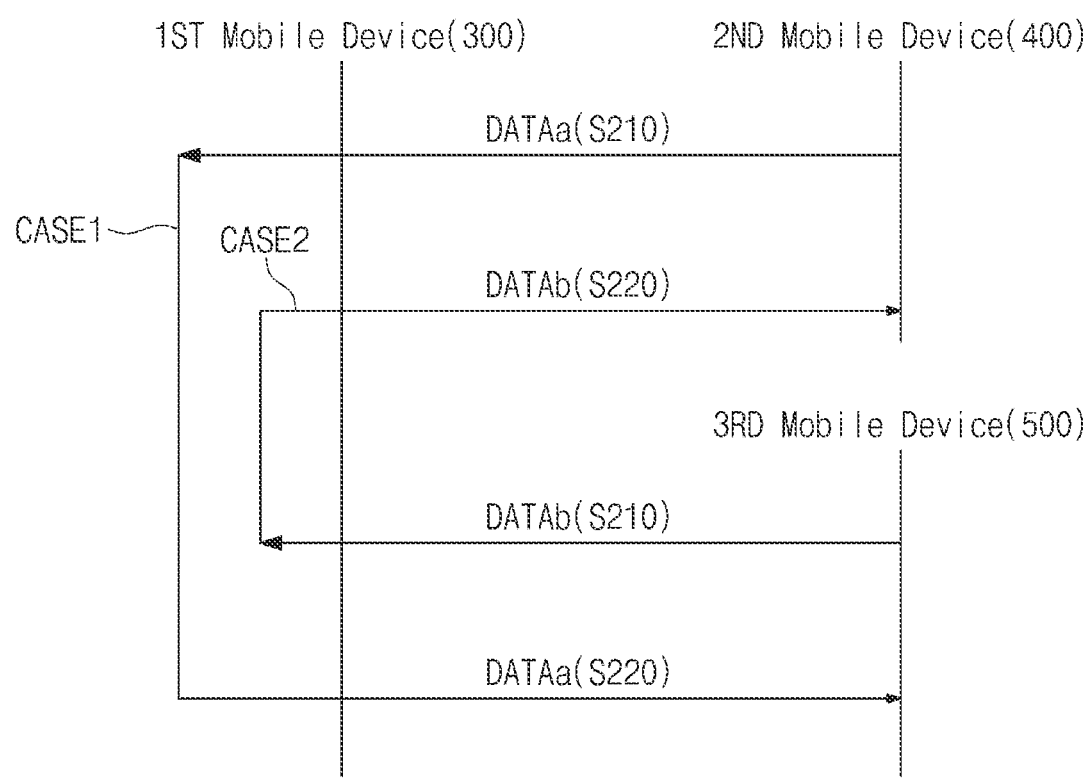
FIG. 9 is a flow diagram illustrating data operations variously performed by a second mobile device and a third mobile device through the first mobile device.

Further in this regard, FIGS. 8 and 9 are respective flow diagrams illustrating various operations performed by at least two of the controller 200, the first mobile device 300, the second mobile device 400 and the third mobile device 500 included in the mobile system 100 of FIG. 1.

Referring to FIGS. 1, 8, and 9, the first mobile device 300 may perform the following functions in response to a command (CMD) received from the controller 200:

(a) generating primary data "DATA" including a plurality of data packets and communicating the primary data "DATA" to the second mobile device 400 and the third mobile device 500;

(b) receiving first secondary data "DATAa" including a plurality of data packets from the second mobile device 400 and communicating the first secondary data "DATAa" to the third mobile device 500 (CASE1);

(c) receiving second secondary data "DATAb" including a plurality of data packets from the third mobile device 500 and communicating the second secondary data "DATAb" to the second mobile device 400 (CASE2); and/or (d) collecting summary data (e.g., "DATA1" and "DATA2") respectively received from the second and third mobile devices 400 and 500 and communicating the summary data "RDATA" to the controller 200.

In some embodiments, components of the summary (or collected) data "RDATA" (e.g., DATA1 and DATA2) may include pass/fail status information related to at least one test performed by at least one of the second and third mobile devices 400 and 500, as well as various system performance information (e.g., CODEC information, battery test information, software/hardware version information, etc.).

The first mobile device 300 may determine a destination (e.g., a data path or a data direction) for each data component (e.g., one or more data packets) of the primary data "DATA" in accordance with the command CMD received from the controller 200, and then communicate each data component of the primary data "DATA" to the determined destination.

In the illustrated example of FIG. 1, the first mobile device 300 includes a first microcontroller unit (MCU) 310, a first power line communication (PLC) modem 340, a first power management integrated circuit (PMIC) 350, and a first battery 360. Here, one or more of the MCUs 310, 410, and 510 may be implemented as a central processing unit (CPU), a processor or a logic device. In some embodiments, the first MCU 310 may include a first memory device 320 storing, wholly or in part, a first computer program 330.

Figure 2:
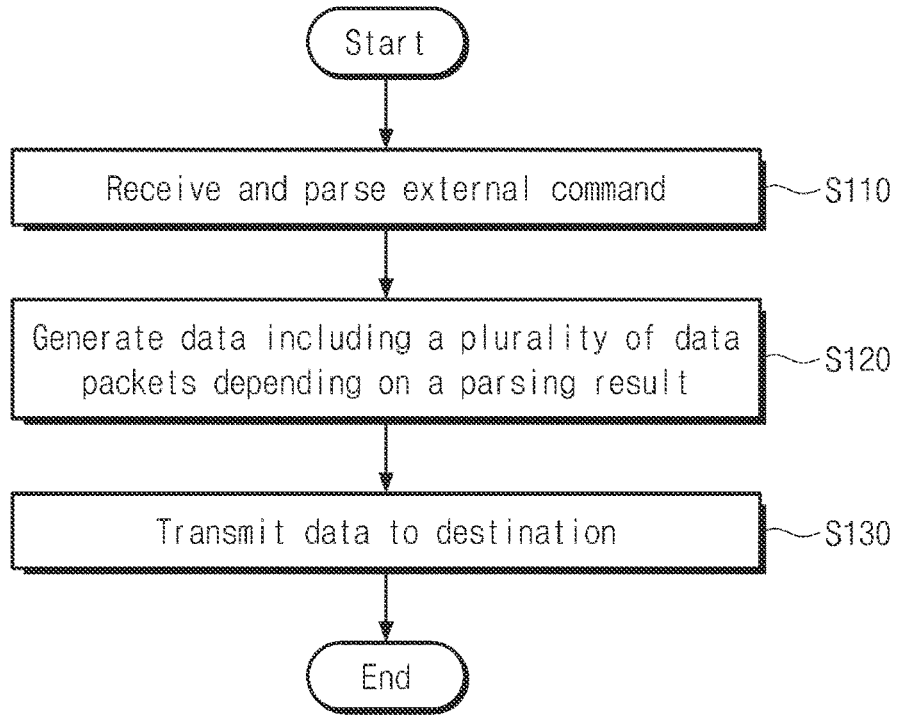
FIGS. 2 and 3 are respective flowcharts illustrating operation of the first mobile device within the mobile system of FIG. 1.

FIG. 2 is a flowchart illustrating operation of the first mobile device 300 in the mobile system 100 of FIG. 1. More particularly, the flowchart of FIG. 2 illustrates various data transmit operations performed by the first mobile device 300, the second mobile device 400 and the third mobile device 500.

Referring to FIGS. 1 and 2, the first MCU 310 may be used to parse the command CMD received from the controller 200 through an interface 311 (S110). Depending on the parsing of the command MD, the mobile device 300 may generate the primary data "DATA" (S120). Here, the primary data "DATA" may be variously generated in accordance with one or more defined data structures. (See, e.g., the exemplary data structure of FIG. 4). The primary data "DATA" may then be provided to one or more destinations, such as the interface 311, the first PLC modem 340, etc. (S130).

In some embodiments, the interface 311 may be configured as a universal asynchronous receiver/transmitter (UART), but the scope of the inventive concept is not limited thereto.

The first PLC modem 340 may include (or be connected to) the first charging terminals T1 and the second charging terminals T2. As noted above, power signal(s) (e.g., a voltage and/or a current signal) may be provided to the second mobile device 400 through the first charging terminals T1 and the third charging terminals TL. Data may also be communicated to the second mobile device 400 through the through the first charging terminals T1 and the third charging terminals TL.

In like manner, various power signal(s) and/or data may be provided to the third mobile device 500 through the second charging terminals T2 and the fourth charging terminals TR.

The first PMIC 350 may be used to manage power (e.g., charging and/or discharging) of the first battery 360 under the control of the first MCU 310.

The second mobile device 400 may include a second MCU 410, a second PLC modem 440, a second PMIC 450, a second battery 460, a first Bluetooth (BT) module 470. Here, the second MCU 410 may include a second memory device 420 storing a second computer program 430. In this regard, the second MCU 410 or the second computer program 430 may be used to generate the first secondary data "DATA1" in response to the primary data "DATA" received from the first mobile device 300, and the first primary data "DATA1" may be communicated to the first mobile device 300.

The second PLC modem 440 may include (or be connected to) the third charging terminals TL, which in turn are connected to the first charging terminals T1 through the first power lines PL1.

The second PMIC 450 may be used to manage power of the second battery 460 under the control of the second MCU 410. For example, the first BT module 470 may communicate with a BT module 610 of the fourth mobile device 600 in order to "pair" the second mobile device 400 and the fourth mobile device 500. That is, each of BT modules 470, 570, and 610 may be implemented as a receiver/transmitter configured to support at least one BT communication protocol.

In some embodiments, the fourth mobile device 600 may be implemented as a smartphone, a laptop computer, a mobile internet device (MID), or a wearable computer.

The third mobile device 500 includes a third MCU 510, a third PLC modem 540, a third PMIC 550, a third battery 560, a second BT module 570, and a third memory device 520 storing a third computer program 530.

The third MCU 510 and/or the third computer program 530 may be used to generates the second secondary data DATA2 in response to the primary data "DATA" received from the first mobile device 300, and the second secondary data DATA2 may be communicated to the first mobile device 300.

The third PLC modem 540 may include (or be connected to) the fourth charging terminals TR, which in turn are connected to the second charging terminals T2 through the second power lines PL2.

The third PMIC 550 may be used to manage power of a third battery 560 under the control of the third MCU 510. The second BT module 570 may be used to communicate with the BT module 610 of the fourth mobile device 600 in order to pair the third mobile device 500 with the fourth mobile device 600.

In some embodiments, at least one of the memory devices 320, 420, and 520 may be implemented as a flash memory device, wherein at least one of the charging terminals T1, T2, TL and TR is configured to operate as a connecting terminal.

Figure 3:
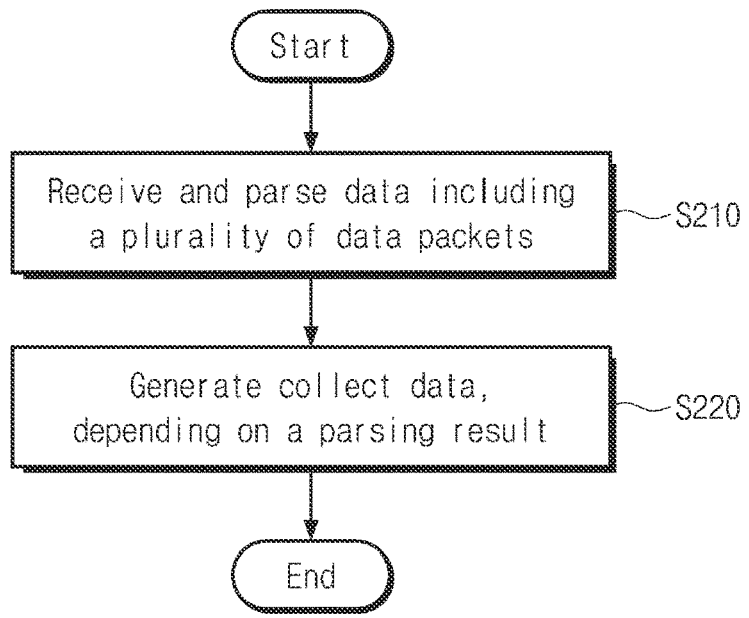

FIG. 3 is a flowchart further illustrating operation of the first mobile device 300 in the mobile system 100 of FIG. 1. More particularly, the flowchart of FIG. 3 illustrates various data receive operations performed within the mobile system 100. Further in this regard, FIG. 8 is a flow diagram illustrating data communication among the components of the mobile system 100.

Referring to FIGS. 1, 2, 3 and 8, the first MCU 310 and/or the first computer program 330 may be used to generate the primary data "DATA" corresponding to the command CMD received from the controller 200. The primary data "DATA" may then be communicated to the second and third mobile devices 400 and 500 (S110, S120 and S130). Using the first MCU 310 and/or the first computer program 330, the first mobile device 300 may receive the first secondary data "DATA1" from the second mobile device 400 in response to the primary data "DATA". Further, using the first MCU 310 and/or the first computer program 330, the first mobile device 300 may receive the second secondary data "DATA2" from the third mobile device 500 in response to the primary data "DATA".

Upon receiving and parsing the first secondary data "DATA1" and the second secondary data "DATA2" (S210), the first MCU 310 and/or the first computer program 330 may be used to generate the collected data "RDATA" including at least a portion of the first collected data "DATA1" and/or a portion of the second collected data "DATA2", depending on the parsing results and may thereafter communicate the collected data "RDATA" to the controller 200 through the interface 311 (S220).

For example, the first MCU 310 and/or the first computer program 330 may be used to parse the first secondary data "DATA1" to extract a first group of data packets included in the first secondary data "DATA1". Likewise, the first MCU 310 and/or the first computer program may be used to parse the second secondary data "DATA2" to extract a second group of data packets included in the second data "DATA2". In this regard, at least one of the first group of data packets and/or at least one of the second group of data packets may be included in the collected data "RDATA". That is, the collected data "RDATA" may be derived, at least in part, from the first group of data packets and the second group of data packets.

FIG. 9 is another flow diagram illustrating data communication among the components of the mobile system 100.

Referring to FIGS. 1, 3, and 9, the first MCU 310 and/or the first computer program 330 may be used to receive and parse the first secondary data "DATAa" provided by the second mobile device 400 (S210). Depending on the parsing of the first secondary data "DATAa", the first MCU 310 and/or the first computer program 330 may communicate at least a portion of the first secondary data "DATAa" to the third mobile device 500 (S220).

Alternately or additionally, the first MCU 310 and/or the first computer program 330 may be used to receive and parse the second secondary data "DATAb" provided by the third mobile device 500 (S210). Depending on the parsing of the second secondary data "DATAb", the first MCU 310 and/or the first computer program 330 may communicate at least a portion of the second secondary data "DATAb" to the second mobile device 400 (S220).

Figure 4:
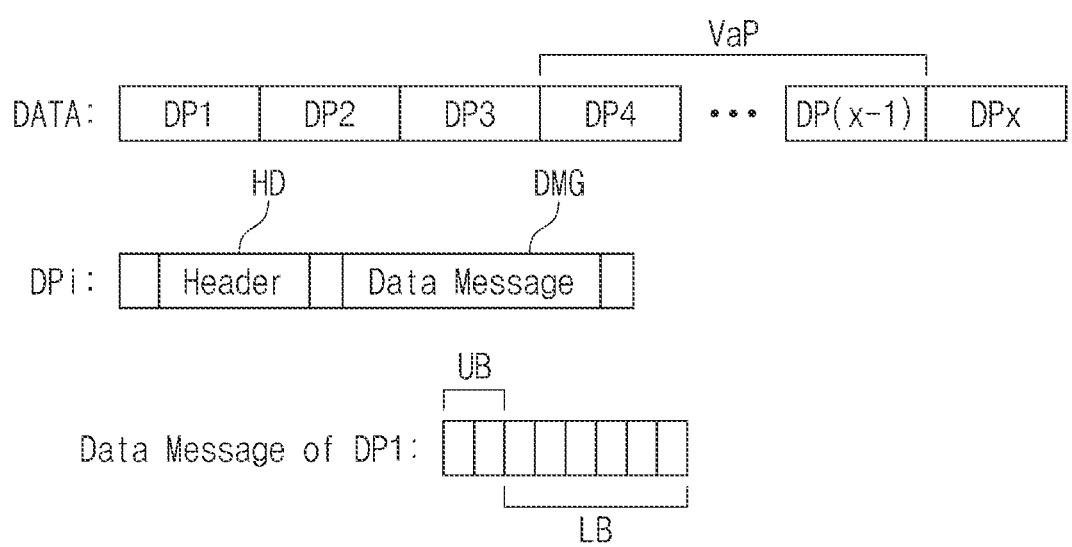
FIG. 4 is a conceptual diagram illustrating an exemplary data structure generated by the first mobile device.

FIG. 4 is a conceptual diagram illustrating an exemplary data structure that may be generated by the first mobile device 300 of the mobile system 100 of FIG. 1, and FIG. 5 is a table listing possible header codes and data messages for various data packets included in the primary data "DATA" data generated by the first mobile device 300.

Referring to FIG. 4, it is assumed that the primary data "DATA" generated by the first mobile device 300 includes a plurality of data packets DP1 to DPx, wherein 'x' is a natural number greater than 4. Here, in some embodiments, the various data components described above (e.g., DATA, RDATA, DATA1, DATA2, DATAa, and DATAb) may have a substantially similar structure. However, the numbers of data packets included in the respective data components (e.g., DATA, RDATA, DATA1, DATA2, DATAa, and DATAb) may differ.

Each data packet DPi ($1 \leq i \leq x$) may include a header HD and a data message DMG. The header HD for each data packet DPi may include a code indicating a "purpose" (alternately termed, a "feature" or "identifier") for each data packet DPi. Each code may include a plurality of bits and may be expressed by a hexadecimal number or a binary number, but scope of the inventive concept is not limited thereto.

In some embodiments, each data packet DPi may further include preamble bits indicating a preamble, a start bit indicating a start of a data packet, a header parity bit for parity of a header, a parity bit for parity of a data message, check-sum bits for check-sum, and an end bit indicating an end of a data packet.

For example, a first data packet DPi (i=1) may include a first header and a first data message, wherein the first header includes a first code CODE1 indicating the purpose of the first data packet DP1, and the first data message includes upper bits UB indicating a destination for a corresponding data component and lower bits LB indicating a number of data packets in a first group VaP included in the data component.

For purposes of further explanation, it is assumed that the data message included in each data packet DPi includes 8 bits, and that in a first data message of the first data packet DP1, the upper bits UB are 2 bits including a most significant bit (MSB) and the lower bits LB are 6 bits including a least significant bit (LSB).

Referring to FIGS. 1, 5, and 8, and assuming that the first mobile device 300 is a source device, the second and third mobile devices 400 and 500 are target (or destination) devices, and the upper bits UB are first upper bits (UB=UB1), the first MCU 310 and/or the first computer program 330 may communicate the primary data "DATA" generated by the first mobile device 300 to the second mobile device 400 and the third mobile device 500 through the first PLC modem 340.

Referring to FIGS. 1, 5, and 9, and assuming that the second mobile device 400 is a first source device, the third mobile device 500 is a first target device, and the upper bits UB are second upper bits (UB=UB2), the first MCU 310 and/or the first computer program 330 may receive the first secondary data "DATAa" from the second mobile device 400 through the PLC modems 340 and 440 and communicate the first secondary data "DATAa" to the third mobile device 500 through the PLC modems 340 and 540.

Alternately, assuming that the third mobile device 500 is a second source device, the second mobile device 400 is a second target device, and the upper bits UB are third upper bits (UB=UB3), the first MCU 310 and/or the first computer program 330 may receive the second secondary data "DATAb" from the third mobile device 500 through the PLC modems 340 and 540 and communicate the second secondary data "DATAb" to the second mobile device 400 through the PLC modems 340 and 440.

Alternately, assuming that the second and third mobile devices 400 and 500 are source devices, the controller 200 is a target device, and the upper bits UB are fourth upper bits (UB=UB4), the first MCU 310 and/or the first computer program 330 may communicate the collected data "RDATA" generated by operation of the first MCU 310 and/or the first computer program 330, wherein the collected data "RDATA" includes at least a portion of the first secondary data "DATA1" and/or the second secondary data "DATA2". Thereafter, the first mobile device 300 may communicate the collected data "RDATA" to the controller 200 through the interface 311.

A second data packet DPi (i=2) may include a second code CODE2 indicating the purpose for the second data packet DP2 and a second data message FDM1, FDM2, or FDM3. Here, the second data message FDM1, FDM2, or FDM3 may be used to indicate a function (or operation) to be performed by at least one target device (e.g., at least one of the second and third mobile devices 400 and 500).

For example, when the second data message included in the second data packet DP2 of the primary data "DATA" generated by the first mobile device 300 is the data message FDM1 indicating execution of a first function, each of the second and third mobile devices 400 and 500 performing the first function should communicate respective secondary data "DATA1 and "DATA2" to the first mobile device 300, wherein each secondary data "DATA1" and "DATA2" and may variously include CODEC information, test result information, hardware/software version information, battery information, etc. to the first mobile device 300.

When the second data message included in the second data packet DP2 of the secondary data "DATAa" or "DATAb" is the data message FDM2 indicating execution of a second function, one of the second and third mobile devices 400 and 500 may perform a coupling operation associated with development of true stereo.

When the second data message included in the second data packet DP2 of the secondary data "DATAa" or "DATAb" is the data message FDM3 indicating execution of a third function, the BT modules 470 and 570 of the second and third mobile devices 400 and 500 may perform a paring operation with the fourth mobile device 600 using various BT communication operations.

The first MCU 310 and/or the first computer program 330 may be used to determined (or calculate) a first cyclic redundancy check value CRC VALUE1 by performing cyclic redundancy check (CRC) on data packets included in the first group VaP and generate a third data packet DP3 including a third header and a third data message including the first CRC VALUE1. The third header may include a third code CODE3 indicating the purpose for the third data packet DP3.

Thus, each of the data packets in the first group VaP may include a header and a data message. For example, an odd-numbered data packet of the data packets in the first group VaP includes a fourth header and a corresponding data message, and the fourth header includes a fourth code CODE4 indicating that the corresponding data packet is an odd-numbered data packet.

An even-numbered data packet of the data packets in the first group VaP includes a fifth header and a corresponding data message, and the fifth header includes a fifth code CODE5 indicating that the corresponding data packet is an even-numbered data packet.

The number of data packets in the first group VaP may be determined depending on a bit value of each of the lower bits LB included in the first data message of the first data packet DP1, and the bit value may be logic 1 or logic 0.

The first MCU 310 and/or the first computer program 330 calculates a second CRC VALUE2 by performing the CRC on the data packets in the first group VaP and generates a sixth data packet DPx including a sixth header and a sixth data message including the second cyclic redundancy check value CRC VALUE2. The sixth header includes a sixth code CODE6 indicating the purpose for the sixth data packet DPx.

The primary data "DATA" may include the first and second CRC values (CRC VALUE1 and CRC VALUE2) in order to ensure the integrity of the primary data "DATA". Here, the first CRC VALUE1 may be positioned in front of the data packets in the first group VaP, and the second CRC VALUE2 may be positioned after of the data packets in the first group VaP, but the scope of the inventive concept is not limited thereto.

Figure 6:
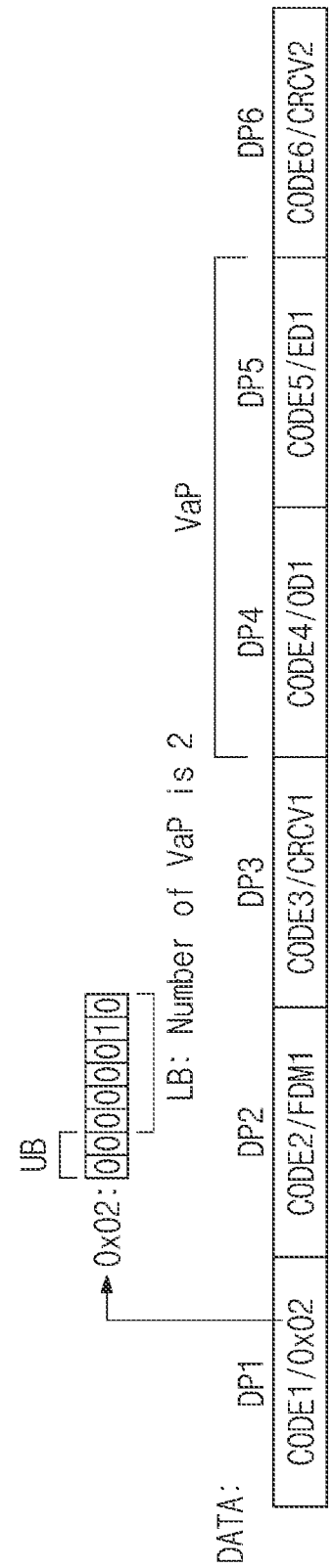
FIG. 6 is a conceptual diagram illustrating an exemplary data structure communicated by the first mobile device to a second mobile device and a third mobile device.

FIG. 6 is a conceptual diagram illustrating another exemplary data structure that may be generated by the first mobile device 300 of the mobile system 100 of FIG. 1.

Referring to FIGS. 1, 2, 3, 4, 5, 6 and 8, it is assumed that the controller 200 generates the command CMD enabling the second and third mobile devices 400 and 500 to perform the first function.

Accordingly, the first MCU 310 and/or the first computer program 330 may receive the command CMD through the interface 311, generate the primary data "DATA" corresponding to the command CMD, and communicate the primary data "DATA" to the second and third mobile devices 400 and 500.

In this regard, the first MCU 310 and/or the first computer program 330 may be used to generate the first data packet DP1 depending on a result of parsing the command CMD.

Here, for example, it is assumed that the first data packet DP1 includes a first header including the first code CODE1, and a first data message. Further assuming that the first data message may be expressed as "0x02" in hexadecimal or "00000010" in binary. Accordingly, the first upper bits (UB=UB1) are "00" in binary, wherein the upper bits (UB=UB1) including a MSB of "00", and the lower bits LB including a LSB of "000010" in binary. The number of data packets in the first group VaP is "2", depending on the lower bits LB.

The first MCU 310 and/or the first computer program 330 may be used to generate the second data packet DP2, wherein the second data packet DP2 includes a second header including the second code CODE2, and the data message FDM1 indicating the first function. Further, the first MCU 310 and/or the first computer program 330 may be used to generate a first CRC value (CRCV1) and a second CRC value (CRCV2) for the data packets of the first group VaP (e.g., data packets DP4 and DP5).

The first MCU 310 and/or the first computer program 330 may be used to: (a) generate the third data packet DP3, wherein the third data packet DP3 includes a third header including the third code CODE3, and a third data message including the first CRC value CRCV1; (b) generate the fourth data packet DP4, wherein the fourth data packet DP4 includes a fourth header including the fourth code CODE4, and a fourth data message OD1; (c) generate the fifth data packet DP5, wherein the fifth data packet DP5 includes a fifth header including the fifth code CODE5, and a fifth data message ED1; (d) generate the sixth data packet DP6, wherein the sixth data packet DP6 includes a sixth header including the sixth code CODE6, and the second CRC value CRCV2; (e) generate the primary data "DATA" including the data packets DP1 to DP6; (f) communicate the primary data "DATA" to the second mobile device 400 through the PLC modems 340 and 440; and (g) communicate the primary data "DATA" to the third mobile device 500 through the PLC modems 340 and 540.

Figure 7:
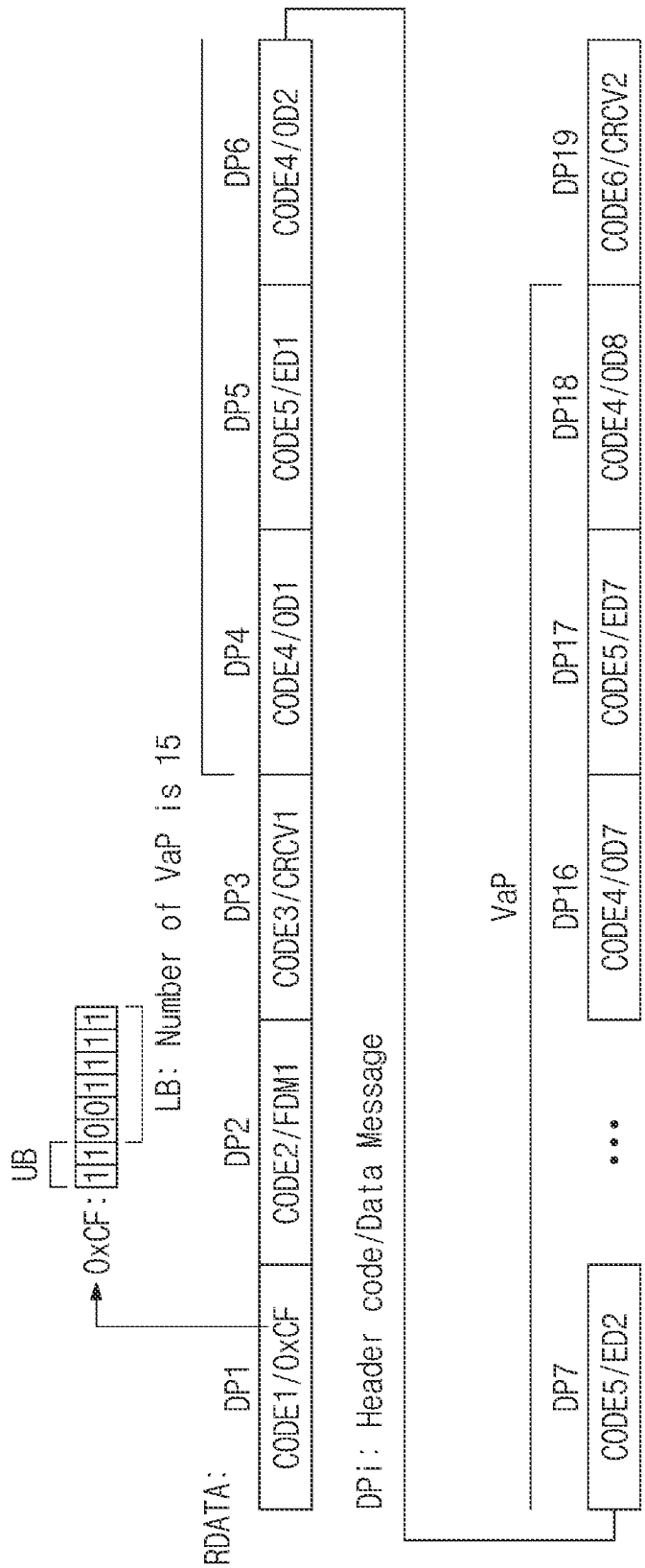
FIG. 7 is a conceptual diagram illustrating an exemplary data structure communicated by the first mobile device to a controller.

FIG. 7 is a conceptual diagram illustrating still another exemplary data structure that may be generated by the first mobile device 300 of the mobile system 100 of FIG. 1.

Referring to FIGS. 1, 2, 3, 4, 5, 6, 7 and 8, it is assumed that a command received from the controller 200 enables the first mobile device 300 to collect the first collected data "DATA1" and the second collected "DATA2" respectively provided by the second and third mobile devices 400 and 500 in order to generate collected data "RDATA". Here, each of the first and second collected data DATA1 and DATA2 may be data corresponding to respective results of the first function, as performed by the second and third mobile devices 400 and 500. Once generated the collected data "RDATA" may be communicated to the controller 200.

As described with reference to FIG. 6, the first MCU 310 and/or the first computer program 330 may be used to receive the command CMD through the interface 311, generate the primary data "DATA" corresponding to the command CMD, and communicate the primary data "DATA" to the second and third mobile devices 400 and 500.

In response, the second mobile device 400 may generate the first secondary data "DATA1" and communicate the first secondary data "DATA1" to the first mobile device 300 through the PLC modem 440. Likewise in response to the primary data "DATA", the third mobile device 500 may generate the second secondary data "DATA2" and communicate the second secondary data "DATA2" to the first mobile device 300 through the PLC modem 540. In this regard, the first MCU 310 and/or the first computer program 330 may be used to receive the first secondary data "DATA1" from the second mobile device 400 and the second secondary data "DATA2" from the third mobile device 500.

The first MCU 310 and/or the first computer program 330 may also be used to generate the first data packet DP1 depending on a result of parsing the command CMD.

For example, the first data packet DP1 may include a first header including the first code CODE1, and a first data message. Here, it is assumed that the first data message is "0xCF" in hexadecimal, or "11001111" in binary.

Accordingly, the fourth upper bits (UB=UB4) including MSB are "11", and the lower bits LB including the LSB are "001111". The number of data packets in the first group VaP is further assumed to be 15 in relation to the lower bits (LB=001111).

Accordingly, the first MCU 310 and/or the first computer program 330 may be used to: (a) generate the second data packet DP2, wherein the second data packet DP2 includes a second header including the second code CODE2, and the data message FDM1 corresponding to the first function; (b) generate the first CRC value CRCV1 and the second CRC value CRCV2 for the data packets in the first group VaP, that is, 15 data packets DP4 to DP18; (c) generate the third data packet DP3, wherein the third data packet DP3 includes a third header including the third code CODE3, and a third data message including the first CRC value CRCV1; and (d) generate the 15 data packets DP4 to DP18 belonging to the first group VaP.

Among the data packets DP4 to DP18 in the first group VaP, each of odd-numbered data packets DP4, DP6, DP8, DP10, DP12, DP14, DP16, and DP18 includes a header including the fourth code CODE4, and each of the odd-numbered data packets DP4, DP6, DP8, DP10, DP12, DP14, DP16, and DP18 also include odd-numbered data messages OD1 to OD8, respectively.

Among the data packets DP4 to DP18 in the first group VaP, each of even-numbered data packets DP5, DP7, DP9, DP11, DP13, DP15, and DP17 includes a header including the fifth code CODE5, and each of the even-numbered data packets DP5, DP7, DP9, DP11, DP13, DP15, and DP17 also include even-numbered data messages ED1 to ED7, respectively.

The first MCU 310 and/or the first computer program 330 may also be used to generate the 19th data packet DP19, wherein the 19th data packet DP19 includes a header including the sixth code CODE6, and 19th data message including the second CRC value CRCV2.

And finally, the first MCU 310 and/or the first computer program 330 may be used to generate the collected data "RDATA" including the data packets DP1 to DP19 and communicate the collected data "RDATA" to the controller 200 through the interface 311.

Of further note, some of the data packets DP4 to DP18 in the first group VaP may correspond to the first secondary data "DATA1" communicated from the second mobile device 400, and the others of the data packets DP4 to DP18 in the first group VaP may correspond to the second secondary data "DATA2" communicated from the third mobile device 500.

In this regard, the second MCU 410 and/or the second computer program 430 may be used to generate the first secondary data ("DATA 1" or "DATAa") and may transmit same to the first mobile device 300. Here, for example, the first secondary data ("DATA1" or "DATAa") may include the first data packet DP1, wherein the first data packet DP1 includes a first header including the first code CODE1, and a first data message, wherein the first data message includes the upper bits UB indicating the destination of the first secondary data ("DATA1" or "DATAa") and the lower bits LB indicating the number of data packets in the first group VaP.

The first secondary data ("DATA1" or "DATAa") may also include the second data packet DP2, wherein the second data packet DP2 includes a second header including the second code CODE2, and a second data message, and the second data message includes one of the data message FDM1, FDM2, or FDM3 corresponding to one of the functions FUNCTION1, FUNCTION2 and FUNCTION3.

In similar manner, the third MCU 510 and/or the third computer program 530 may be used to generate the second secondary data ("DATA2" or "DATAb") and communicate same to the first mobile device 300. For example, the second secondary data ("DATA2" or "DATAb") may include the first data packet DP1, wherein the first data packet DP1 includes a first header including the first code CODE1, and a first data message; the first data message includes the upper bits UB indicating the destination of the second data DATA2 or DATAb and the lower bits LB indicating the number of data packets in the first group VaP.

The second secondary data ("DATA2" or "DATAb") may also include the second data packet DP2, wherein the second data packet DP2 includes a second header including the second code CODE2, and a second data message, and the second data message includes one of the data message FDM1, FDM2, or FDM3 corresponding to one of the functions FUNCTION1, FUNCTION2 and FUNCTION3.

Here, it should be noted that one or more of the first, second and third computer programs 330, 430, and 530 may be variously stored in the first, second and/or third memory devices 320, 420, and 520. One or more of the first, second and third computer programs 330, 430, and 530 may be variously executed by one or more of the first, second and third MCUs 310, 410, and 510. Here, one or more of the first, second and third memory devices 320, 420, and 520 may be implemented using non-transitory computer-readable medium, such as a flash memory device.

In some embodiments wherein each of the first, second and third mobile devices 300, 400, and 500 is separately implemented, the second mobile device 400 and the third mobile device 500 may exchange the first and second secondary data DATAa and DATAb using BT modules 470 and 570.

Consistent with the foregoing, embodiments of the inventive concept may provide a mobile device capable of performing various data communication through charging terminals. Other embodiments of the inventive concept provide a mobile system including multiple mobile devices capable of variously exchanging data including a plurality of data packets through power line communication without a separate device.

While the inventive concept has been described with reference to embodiments thereof, it will be apparent to those of ordinary skill in the art that various changes and modifications may be made thereto without departing from the spirit and scope of the inventive concept as set forth in the following claims.

What is claimed is:

1. A first mobile device comprising:
    first charging terminals;
    a power line communication modem configured to supply power to a second mobile device connected with the first charging terminals and to perform data communication with the second mobile device, wherein the data communication includes a plurality of data packets; and
    a microcontroller unit configured to generate primary data including a first data packet among the plurality of data packets, wherein the first data packet includes a first header and a first data message,
    wherein the first header includes a first code indicating a purpose for the first data packet, and the first data message includes upper bits indicating a destination for data and lower bits indicating a number of data packets included in a first group in the data.

2. The first mobile device of claim 1, wherein the microcontroller unit is further configured to:
    generate a second data packet among the plurality of data packets, wherein the second data packet includes a second header and a second data message indicating a function to be performed by the second mobile device; and
    generate the primary data sequentially including the first data packet and the second data packet,
    wherein the second header includes a second code indicating a purpose for the second data packet.

3. The first mobile device of claim 2, wherein the microcontroller unit is further configured to:
    calculate a first cyclic redundancy check value for the data packets in the first group;
    generate a third data packet including a third header and a third data message indicating the first cyclic redundancy check value; and
    generate the data sequentially including the first data packet, the second data packet, and the third data packet,
    wherein the third header includes a third code indicating a purpose for the third data packet.

4. The first mobile device of claim 3, wherein the microcontroller unit is further configured to:
    calculate a second cyclic redundancy check value for the data packets in the first group;
    generate a fourth data packet including a fourth header and a fourth data message including the second cyclic redundancy check value; and
    generate the data sequentially including the first data packet, the second data packet, the third data packet, the data packets in the first group, and the fourth data packet,
    wherein the fourth header includes a fourth code indicating a purpose for the fourth data packet.

5. The first mobile device of claim 4, further comprising:
    second charging terminals; and
    an interface configured to receive a command from an external device,
    wherein the power line communication modem is further configured to supply power to a third mobile device connected to the second charging terminals, and perform data communication with the third mobile device, and
    the microcontroller unit is further configured to receive first secondary data from the second mobile device through the power line communication modem, and communicate the first secondary data to one of the third mobile device through the power line communication modem and the external device through the interface in response to the command.

6. The first mobile device of claim 4, further comprising:
    second charging terminals,
    wherein the power line communication modem is configured to supply power to a third mobile device connected to the second charging terminals and perform data communication with the third mobile device,
    wherein the first mobile device is a charger configured to independently charge the second mobile device and the third mobile device, and
    each of the second mobile device and the third mobile device is a wireless earphone.

7. The first mobile device of claim 4, further comprising:
    second charging terminals; and
    an interface configured to receive a command from an external device,
    wherein the power line communication modem is further configured to supply the power to a third mobile device connected with the second charging terminals, and perform data communication with the third mobile device,
    when the upper bits are first upper bits, the microcontroller unit communicates the primary data to the second mobile device and the third mobile device through the power line communication modem, else
    when the upper bits are second upper bits, the microcontroller unit receives first secondary data from the second mobile device through the power line communication modem and communicates the first secondary data to the third mobile device through the power line communication modem, else
    when the upper bits are third upper bits, the microcontroller unit receives second secondary data from the third mobile device through the power line communication modem and communicates the second secondary data to the second mobile device through the power line communication modem, else
    when the upper bits are fourth upper bits, the microcontroller unit communicates collected data to the external device through the interface.

8. The first mobile device of claim 7, wherein the microcontroller unit is further configured to generate the collected data using the first secondary data received from the second mobile device and the second secondary data received from the third mobile device.

9. The first mobile device of claim 2, wherein a function to be performed by the second mobile device varies among a first function, a second function and a third function in response to the second data message,
    the first function causes the second mobile device to communicate at least one of CODEC information for the second mobile device, test information results for the second mobile device, battery information for the second mobile device, and hardware/software version information for the second mobile device;
    the second function couples the second mobile device and a third mobile device; and
    the third function causes a pairing of the second mobile device with a mobile phone.

10. The first mobile device of claim 1, further comprising:
    an interface configured to receive a command from an external device,
    wherein the microcontroller unit is further configured to parse the command to generate a parsing result, communicate data to the interface when the parsing result indicates the external device as a destination, and communicate data to the power line communication modem when the parsing result indicates the second mobile device as a destination.

11. A mobile system comprising:
a first mobile device including a first power line communication (PLC) modem, first charging terminals connected to the first PLC modem, second charging terminals connected to the first PLC modem, a first microcontroller unit (MPU) including a first memory storing a first computer program, a first battery, and a first power management integrated circuit (PMIC) controlling the first battery;
a second mobile device including a second PLC modem, third charging terminals connected to the second PLC modem and configured to electrically connect the first charging terminals, a second MPU including a second memory storing a second computer program, a second battery, and a second PMIC controlling the second battery; and
a third mobile device including a third PLC modem, fourth charging terminals connected to the third PLC modem and configured to electrically connect the second charging terminals, a third MPU including a third memory storing a third computer program, a third battery, and a third PMIC controlling the third batter,
wherein the first PLC modem is configured to supply power to the second mobile device through the first charging terminals and the third charging terminals, and supply power to the third mobile device through the second charging terminals and the fourth charging terminals,
at least one of the first PLC modem and the first computer program is configured to generate primary data in response to a command received from an external controller, communicate the primary data to the second mobile device through the first charging terminals and the third charging terminals, and communicate the primary data to the third mobile device through the second charging terminals and the fourth charging terminals, and
the primary data includes a first data packet including a first header indicating a purpose for the first data packet and a first message indicating a number of data packets in the primary data.

12. The mobile system of claim 11, wherein at least one of the second PLC modem and the second computer program generates first secondary data in response to the primary data and communicates the first secondary data to the first mobile device;
at least one of the third PLC modem and the third computer program generates second secondary data in response to the primary data and communicates the second secondary data to the first mobile device;
at least one of the first PLC modem and the first computer program is further configured to generate collected data and communicate the collected data to the external controller, and
the collected data includes at least a portion of the first secondary data and the second secondary data.

13. The mobile system of claim 12, wherein the collected data includes pass/fail status information related to a test performed by at least one of the second mobile device and the third mobile device.

14. The mobile system of claim 12, wherein the collected data includes at least one of CODEC information related to at least one of the first PLC modem, the second PLC modem and the third PLC modem, battery test information related to at least one of the second battery and the third battery, and software/hardware version information related to at least one of the second mobile device and the third mobile device.

15. The mobile system of claim 11, wherein the primary data further includes a variable first group of data packets, the first header includes a first code indicating a purpose for the first data packet, and
the first message includes upper bits indicating a destination for at least one data component of the primary data and lower bits indicating a number of data packets in the variable first group of data packets.

16. The mobile system of claim 15, wherein the primary data further includes a second data packet including a second message indicating one function among a plurality of functions to be performed by the second mobile device.

17. The mobile system of claim 16, wherein the primary data further includes a third data packet including a third message indicating at least one cyclic redundancy check value associated with the primary data.

18. A mobile system comprising:
a first mobile device including a first power line communication (PLC) modem, first charging terminals connected to the first PLC modem, second charging terminals connected to the first PLC modem, and a first microcontroller unit (MPU);
a second mobile device including a second PLC modem, third charging terminals connected to the second PLC modem and configured to electrically connect the first charging terminals, and a second MPU;
a third mobile device including a third PLC modem, fourth charging terminals connected to the third PLC modem and configured to electrically connect the second charging terminals, and a third MPU,
wherein the first PLC modem is configured to supply power to the second mobile device through the first charging terminals and the third charging terminals, and supply power to the third mobile device through the second charging terminals and the fourth charging terminals,
the first PLC modem is further configured to generate primary data in response to a command received from an external controller,
communicate the primary data to the second mobile device through the first charging terminals and the third charging terminals, and communicate the primary data to the third mobile device through the second charging terminals and the fourth charging terminals,
the primary data includes a first data packet including a first header indicating a purpose for the first data packet and a first message indicating a number of data packets in the primary data,
the second PLC modem is configured to generate first secondary data in response to the primary data and communicate the first secondary data to the third mobile device through the first mobile device; and
the third PLC modem is configured to generate second secondary data in response to the primary data and communicate the second secondary data to the second mobile device through the first mobile device.

19. The mobile system of claim 18, wherein at least one of the primary data, the first secondary data, and the second secondary data includes:
a first data packet including a first header indicating a purpose for the first data packet and a first message indicating at least one target device and at least one source device;

a second data packet including a second header and a second message indicating one function among a plurality of functions to be performed by at least one of the first mobile device, the second mobile device and the third mobile device; and a third data packet including a third message indicating at least one cyclic redundancy check value.

20. The mobile system of claim 18, wherein each of the second mobile device and the third mobile device is one of a wireless earbud, a wireless earphone, and a wireless headphone, and each of the second mobile device and the third mobile device is configured to operate as a true wireless earphone.

* * * * *